(12) United States Patent
Duchateau et al.

(10) Patent No.: US 11,603,419 B2
(45) Date of Patent: Mar. 14, 2023

(54) PROCESS FOR THE PREPARATION OF AN OLEFINIC COPOLYMER HAVING POLAR GROUPS AND THE PRODUCTS OBTAINED THEREFROM

(71) Applicant: SABIC GLOBAL TECHNOLOGIES B.V., Bergen Op Zoom (NL)

(72) Inventors: Robbert Duchateau, Eindhoven (NL); Miloud Bouyahyi, Eindhoven (NL); Lidia Jasinska-Walc, Eindhoven (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 761 days.

(21) Appl. No.: 16/467,127

(22) PCT Filed: Dec. 4, 2017

(86) PCT No.: PCT/EP2017/081333
§ 371 (c)(1),
(2) Date: Jun. 6, 2019

(87) PCT Pub. No.: WO2018/104211
PCT Pub. Date: Jun. 14, 2018

(65) Prior Publication Data
US 2020/0071434 A1    Mar. 5, 2020

(30) Foreign Application Priority Data

Dec. 6, 2016   (EP) .................................... 16202309

(51) Int. Cl.
| | |
|---|---|
| *C08F 4/69* | (2006.01) |
| *C08F 4/6592* | (2006.01) |
| *C08F 216/02* | (2006.01) |
| *C08F 210/02* | (2006.01) |

(52) U.S. Cl.
CPC .......... *C08F 210/02* (2013.01); *C08F 4/6592* (2013.01); *C08F 4/69* (2013.01); *C08F 216/02* (2013.01); *C08F 2420/01* (2013.01)

(58) Field of Classification Search
CPC ................ C08F 4/62044; C08F 4/6592; C08F 216/02
See application file for complete search history.

(56) References Cited

U.S. PATENT DOCUMENTS 10,519,267 B2 *  12/2019  Duchateau ............. C08G 64/18

FOREIGN PATENT DOCUMENTS

| EP | 1186619 A2 | 3/2002 | |
|---|---|---|---|
| WO | 9319104 A1 | 9/1993 | |
| WO | 9613529 A1 | 5/1996 | |
| WO | 9742236 A1 | 11/1997 | |
| WO | 2016097204 A1 | 6/2016 | |
| WO | 2016097207 A1 | 6/2016 | |
| WO | WO-2016097207 A1 * | 6/2016 | ............... C08F 2/38 |

OTHER PUBLICATIONS

Journal of Polymer Science, Part A: Polymer Chemistry, vol. 37, No. 14, Jul. 15, 1999, pp. 2457-2469 (Year: 1999).*
Baier et al.; "Post-Metallocenes in the Industrial Production of Polyolefins"; Angewandte Chemie International Edition, vol. 53, No. 37; Aug. 2014; pp. 9722-9744.
International Search Report for International Application No. PCT/EP2017/081333, International Filing Date Dec. 4, 2017, dated Mar. 27, 2018, 6 pages.
Marks et al.; "Cocatalysts for Metal-Catalyzed Olefin Polymerization: Activators, Activation Processes, and Structure-Activity Relationships"; Chemical Reviews, vol. 100, No. 1; 2000; pp. 1391-1434.
Written Opinion for International Application No. PCT/EP2017/081333, International Filing Date Dec. 4, 2017, dated Mar. 27, 2018, 9 pages.

* cited by examiner

*Primary Examiner* — Caixia Lu
(74) *Attorney, Agent, or Firm* — Cantor Colburn LLP (57) ABSTRACT

The present invention concerns a process for the preparation of a copolymer comprising the steps of copolymerizing under suitable reaction conditions at least one first type of olefin monomer and at least one second type of functionalized olefin monomer using a catalyst system to obtain a polyolefin main chain having one or multiple functionalized short chain branches, the catalyst system comprising: i) a single-site catalyst or catalyst precursor comprising a metal selected from $Ti^{3+}$ or $Cr^{3+}$; ii) a co-catalyst; iii) optionally a scavenger.

16 Claims, 2 Drawing Sheets

Figure 1

Figure 2

PROCESS FOR THE PREPARATION OF AN OLEFINIC COPOLYMER HAVING POLAR GROUPS AND THE PRODUCTS OBTAINED THEREFROM

CROSS REFERENCE TO RELATED APPLICATIONS

This application is a National Stage application of PCT/EP2017/081333, filed Dec. 4, 2017, which claims the benefit of European Application No. 16202309.7, filed Dec. 6, 2016, both of which are incorporated by reference in their entirety herein.

The present invention relates to a process for the copolymerization of olefinic monomers having a polar group, the copolymers obtained in such process and the use of the copolymers in different applications.

BACKGROUND

Copolymerization of olefins with catalysts is known for many years. Typical catalysts are Ziegler Natta catalysts and metallocene catalysts that can homo- and copolymerize olefinic monomers like ethylene, propylene, 1-butene, 1-hexene, 1-octene and the like in high yields, producing (co)polymers with high molecular weight and good properties. The catalysts coordinate the olefinic monomers, which have electron density available for coordination in the carbon-carbon double bond. Once coordination of the olefinic monomer has taken place at the C=C bond, a rapid insertion of the monomer takes place giving elongation of a polymer chain attached to the catalyst. The commonly used early/middle transition metal-based catalysts are extremely sensitive to nucleophilic/Lewis basic functionalities containing heteroatoms like O, N, P and S, which coordinate strongly to the catalytic center and easily deactivate the catalyst. Therefore, olefin polymerization using such early/middle transition metal-based catalysts is always carried out under the most stringent conditions, in the absence of water and polar components.

So far, it has not been possible to successfully polymerize olefin monomers having nucleophilic polar groups using early/middle transition metal-based catalysts without compromising the catalyst activity as a result of catalyst poisoning by the functionalized comonomer.

The most straightforward method to produce randomly functionalized polyolefins is by copolymerizing ethylene and/or α-olefins with nucleophile-functionalized olefinic comonomers. The biggest drawback of this approach, however, is the poisoning effect of the nucleophilic functionality on the catalyst. To avoid this poisoning effect, the functionality is generally pacified by treatment of chlorosilanes or aluminum alkyls, but generally this method is not sufficient. WO 2016/097204 describes the copolymerization of olefins with olefinic monomers having a metal pacified functionalized group.

Alternatively, late transition metals may be employed to produce randomly functionalized polyolefins possibly without pacifying the functionality of the comonomer by chlorosilanes or aluminum alkyls. However, the presence of nucleophile-functionalized comonomers may still reduce the activity of these catalysts as well. Furthermore, late transition metal catalysts typically are not stereospecific and might undergo chain walking, which generates amorphous or low-melting branched products and they are costly.

Polyolefins having a certain amount of polar groups may have interesting properties: it can be expected that interaction of these polyolefins with polar polymers may improve, paintability and adhesion to other substrates like metal and glass may increase, and other advantageous properties will be found, once such polymers would become available.

The aim of the present invention is to provide an easy, versatile and tunable process for the preparation of copolymers of olefins with an olefinic monomer containing at least one functional group.

One or more of these aims are obtained by the process according to the present invention.

SUMMARY OF THE INVENTION

The present invention relates to a process for the preparation of a copolymer comprising the steps of:
copolymerizing at least one first type of olefin monomer and at least one second type of functionalized olefin monomer using a catalyst system to obtain a polyolefin main chain having one or multiple functionalized short chain branches, the catalyst system comprising:
i) a single-site catalyst or catalyst precursor comprising a metal selected from Ti3+ or Cr3+;
ii) a co-catalyst;
The catalyst system can further comprise: iii) optionally a scavenger.

One of the advantages of the use of Ti3+ and/or Cr3+ single-site catalysts is the fact that these are less susceptible to poisoning by olefinic monomers having a nucleophilic functional group, especially a hydroxyl or carboxylic acid functional group. This may surprisingly reduce the drop in activity and/or even increase the activity when the amount of olefinic monomers having a nucleophilic functional group added to the polymerization system is increased.

This effect is most abundant when the molar ratio of polar olefinic monomer to catalyst is at least 100, or at least 300, or at least 500. Preferably, the molar ratio of polar olefinic monomer to catalyst may be between 400 and 5000, further preferred between 400 and 2000 or between 400 and 1500.

It is even more unexpected that this effect can take place with polar olefinic monomers, wherein the distance between the olefinic double bond, which is used in the polymerization reaction, and the polar part of the molecule is very short, for example one C-atom, or a few carbon atoms. For other olefin polymerization catalyst systems, this leads to a deactivation of the polymerization catalyst.

Definitions

The following definitions are used in the present description and claims to define the stated subject matter. Other terms not cited below are meant to have the generally accepted meaning in the field.

"short chain branch" as used in the present description means: a branch that comprises between 1 and 100 carbon atoms, preferably 1 to 50 carbon atoms, further preferred 1 to 20 carbon atoms, most preferably 2 to 8 carbon atoms. Short chain branches are preferably much smaller than the backbone of the linear molecule to which they are attached.

"hydrocarbyl" as used in the present description means: a substituent containing hydrogen and carbon atoms; it is a linear, branched or cyclic saturated or unsaturated aliphatic substituent, such as alkyl, alkenyl, alkadienyl and alkynyl; alicyclic substituent, such as cycloalkyl, cycloalkadienyl cycloalkenyl; aromatic substituent, such as monocyclic or polycyclic aromatic substituent, as well as combinations thereof, such as alkyl-substituted aryls and aryl-substituted alkyls. It may be substituted with one or more non-hydrocarbyl, heteroatom-containing substituents. Hence, when in the present description "hydrocarbyl" is used it can also be "substituted hydrocarbyl", unless stated otherwise. Included in the term "hydrocarbyl" are also perfluorinated hydrocarbyls wherein all hydrogen atoms are replaced by fluorine atoms. A hydrocarbyl may be present as a group on a compound (hydrocarbyl group) or it may be present as a ligand on a metal (hydrocarbyl ligand).

"chain transfer agent" as used in the present description means: a compound that is capable of reversibly or irreversibly interchanging hydrocarbyls with the active catalyst and/or other metal hydrocarbyls. It is a metal compound comprising at least one ligand with a weak chemical bond.

"single-site catalyst" or 'metal catalyst' as used in the present description may mean: a catalyst which contains a single catalytically active metal center that forms the active site. In the context of the present invention, a "metal catalyst" is the same as a "transition metal catalyst" wherein the metal is a transition metal chosen from Ti 3+ and Cr 3+. Preferably, Preferably, a single-site catalyst according to the invention may be a compound according to formula (I) or formula (II).

"metal catalyst precursor" as used in the present description means: a compound that upon activation forms the active single-site catalyst.

""Metallocene" refers to a sandwich complex comprising a transition metal, group 3 metal or lanthanide coordinated to two members of five-member carbon ring, i.e. substituted cyclopentadienyl (Cp), hetero-substituted five- or six membered aromatic ring, or a bridged (ansa) ligand consisting of five-member carbon rings and/or hetero-substituted five- or six membered aromatic rings, wherein the ansa bridge B can contain elements such as carbon, boron, silicon, phosphorus, sulfur, oxygen, nitrogen, germanium, tin. Examples of bridges are $CH_2CH_2$ (ethylene), $Me_2Si$ (dimethylsilyl), $Ph_2Si$ (diphenylsilyl), $Me_2C$ (isopropylidene), $Ph_2C$ (diphenylmethylene), PhP (phenylphosphoryl), PhB (diphenylboryl), $Me_2SiSiMe_2$ (tetramethyldisilanyl) and the like. In particular, preferred metallocenes are derivatives of a cyclopentadienyl (Cp) group, including cyclopentadienyl, substituted cyclopentadienyls, indenyl, fluorenyl, tetrahydroindenyl, phosphocyclopentadienes, borabenzenes, 1-metallocyclopenta-2,4-dienes, bis(indenyl)ethane, and mixtures thereof. Metallocene catalysts are typically activated by combining the active metal species with boranes, borates, or aluminoxane compounds well known in the art (for example methylaluminoxane (MAO)), optionally in the presence of alkylating agents like for example trialkyl aluminum compounds.

"Half-metallocene" as used in the present description may for example mean: a metal catalyst or catalyst precursor typically consisting of one five-member carbon ring, i.e. substituted cyclopentadienyl (Cp), hetero-substituted five- or six membered aromatic ring, bound to a metal active site. In particular, preferred half-metallocenes are derivatives of a cyclopentadienyl (Cp) group, including cyclopentadienyl, substituted cyclopentadienyls, indenyl, fluorenyl, tetrahydroindenyl, phosphocyclopentadienes, or borabenzenes. Half-metallocene catalysts are typically activated by combining the active metal species with boranes, borates, or aluminoxane compounds well known in the art (for example methylaluminoxane (MAO)), optionally in the presence of alkylating agents like for example trialkyl aluminum compounds.

"Post-metallocene" as used in the present description may mean especially for example: a metal catalyst that contains no substituted cyclopentadienyl (Cp) ligands, but may contains one or more anions bound to the metal active site, typically via a heteroatom. Post-metallocene catalysts are typically activated by combining the active metal species with boranes, borates, or aluminoxane compounds well known in the art (for example methylaluminoxane (MAO)), optionally in the presence of alkylating agents like for example trialkyl aluminum compounds.

"main group metal" as used in the present description means: a metal that is an element of Groups 1, 2, and 13-15 of the IUPAC Periodic Table of elements. In other words, metals of:
  Group 1: lithium (Li), sodium (Na), and potassium (K)
  Group 2: beryllium (Be), magnesium (Mg), and calcium (Ca)
  Group 13: boron (B), aluminum (Al), gallium (Ga), and indium (In)
  Group 14: germanium (Ge), and tin (Sn)
  Group 15: antimony (Sb), and bismuth (Bi)
  main group metals also include for the context of the present invention zinc (Zn).

"co-catalyst" as used in the present description means: a compound that activates the metal catalyst precursor to obtain the active metal catalyst.

"scavenger" as used in the present description means: a compound that reacts with impurities present in the polymerization reactor, solvent and monomer feed, thereby preventing poisoning of the catalyst during the olefin polymerization process.

"methylaluminoxane" or "MAO" as used in the present description means: a compound derived from the partial hydrolysis of trimethyl aluminum that serves as a co-catalyst for catalytic olefin polymerization.

"SMAO" as used in the present description means: supported methylaluminoxane, viz. a methylaluminoxane bound to a solid support.

"DMAO" as used in the present description means: depleted methylaluminoxane, viz. a methylaluminoxane from which the free trimethyl aluminum has been removed.

"MMAO" as used in the present description means: modified methylaluminoxane, viz. the product obtained after partial hydrolysis of trimethyl aluminum plus another trialkyl aluminum such as triisobutyl aluminum or tri-n-octyl aluminum.

"fluorinated aryl borate or fluorinated aryl borane" as used in the present description means: a borate compound having three or four fluorinated (preferably perfluorinated) aryl ligands or a borane compound having three fluorinated (preferably perfluorinated) aryl ligands.

"halide" as used in the present description means: an ion selected from the group consisting of: fluoride ($F^-$), chloride ($Cl^-$), bromide ($Br^-$) and iodide ($I^-$).

"halogen" as used in the present description means: an atom selected from the group consisting of: fluorine (F), chlorine (Cl), bromine (Br) and iodine (I).

"heteroatom" as used in the present description means: an atom other than carbon or hydrogen. Heteroatom also includes halides.

The term "alkyl" is used herein to refer to both linear and branched hydrocarbon groups. These hydrocarbon groups can be saturated and unsaturated. Alkyl groups have at least one carbon atom and, in some embodiments, 1 to 40 (C1-C40 alkyl may thereby mean an alkyl with 1 to 40 carbon atoms) or 1 to 12 or 1 to 6 carbon atoms. Alkyl groups can be optionally substituted with heteroatom-containing substituents. Examples of alkyl groups include, but are not limited to, chemical groups such as methyl, ethyl, n-propyl, isopropyl, n-butyl, isobutyl, n-hexyl, cyclohexyl, n-octyl.

The term "aryl", as used herein, is an aromatic carbocyclic moiety of up to 40 carbon atoms, (e.g. 1-40 carbon atoms), which may be a single ring (monocyclic) or multiple rings (e.g. bicyclic) fused together or linked covalently. Any suitable ring position of the aryl moiety may be covalently linked to the defined chemical structure. Aryl groups can optionally include heteroatoms. Examples of aryl moieties include, but are not limited to, chemical groups such as phenyl, p-tolyl, 1-naphthyl, 2-naphthyl, dihydronaphthyl, tetrahydronaphthyl, biphenyl, anthryl, phenanthryl, fluorenyl, indenyl, biphenylenyl, acenaphthenyl, acenaphthylenyl, and the like. It is preferred that the aryl moiety contains 6-14 carbon atoms.

The term "alkylaryl", as used herein, may be a C1-C40 alkylaryl (an alkylaryl with 1 to 40 carbon atoms), especially for example a C6-C20 aryl suitably substituted on any open ring position with an alkyl moiety wherein the alkyl chain is either a (C1-C20) straight or (C3-C20) branched-chain saturated hydrocarbon moiety. C1-020 or C3-C20 may thereby mean with 1 to 20 or with 3 to 20 carbon atoms. Aryl groups can optionally include heteroatoms. Examples of alkylaryl moieties include, but are not limited to, chemical groups such as benzyl, 1-phenylethyl, 2-phenylethyl, diphenylmethyl, 3-phenylpropyl, 2-phenylpropyl, fluorenylmethyl, ortho-picolyl, 2-N,N-dimethylamino-benzyl, and homologs, isomers, and the like. A group, such as a benzyl group, may be bound to the chemical structure through the methylene group.

The term "alkenyl", as used herein, may be a C1-C40 alkenyl (an alkenyl with 1 to 40 carbon atoms). Aryl groups can optionally include heteroatoms.

"alkadienyl" may be an alkenyl with two carbon-carbon double bonds.

"alkynyl" as used in the present description may mean: a group consisting of carbon and hydrogen atoms having at least one carbon-carbon triple bonds. An alkynyl may thereby preferably comprise 2 to 40 carbon atoms.

"silyl group" as used in the present description means: a linear, branched or cyclic substituent containing 1-20 silicon atoms. Said silyl group may comprise Si—Si single or double bonds.

Expressions like for example "$C_1$-$C_{20}$" and similar formulations may refer to a range regarding a number of carbon atoms, here for example from 1 to 20 carbon atoms.

DETAILED DESCRIPTION OF THE INVENTION

The present invention relates to the novel and inventive process for the preparation of copolymers comprising a polyolefin main chain and one or more pendant functional groups and the products obtained therefrom.

The key to the present invention is the use of two different types of olefin monomers in the polymerization: a first type of olefin monomer and a second type of olefin comonomer having a functional group; resulting in a random copolymer containing short chain branches having functional groups.

The catalyst system used comprises: i) a single-site catalyst or catalyst precursor containing trivalent titanium (Ti3+) or chromium (Cr 3+); ii) a co-catalyst; and iii) optionally a scavenger.

The first type of olefin monomer has the following structure according to Formula I-A:

wherein C is carbon and wherein $R^{1a}$, $R^{1b}$, $R^{1c}$, and $R^{1d}$ are each independently selected from the group consisting of H or hydrocarbyl with 1 to 16 carbon atoms.

The hydrocarbyl may for example be an alkyl, alkenyl, alkadienyl and alkynyl. It may also be an alicyclic substituent, such as cycloalkyl, cycloalkadienyl cycloalkenyl. It may also be an aromatic substituent, such as monocyclic or polycyclic aromatic substituent, as well as combinations thereof, such as alkyl-substituted aryls and aryl-substituted alkyls. The hydrocarbyl may be substituted with one or more non-hydrocarbyl-containing groups e.g. a heteroatom.

Preferably, the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, cyclopentene, cyclohexene, norbornene, ethylidene-norbornene, and vinylidene-norbornene and one or more combinations thereof. Preferably, said first type of olefin monomer is ethylene or propylene.

In addition, a combination of for example ethylene and/or propylene on one hand and one or more other olefins on the other hand can also be used as the first type of olefin monomer. Substituted analogues of the monomers discussed above may also be used, e.g. substituted by one or more halogens. Also aromatic monomers may be used according to the present invention.

The second, functionalized, olefin monomer has the following structure according to Formula I-B:

wherein C is carbon, wherein $R^2$, $R^3$, and $R^4$ are each independently selected from the group consisting of H or hydrocarbyl with 1 to 16 carbon atoms, wherein $R^5$—X—H is a heteroatom-containing functional group, whereby $R^5$ is either $C(R^{7a})(R^{7b})$ or a plurality of $C(R^{7a})(R^{7b})$ groups, wherein $R^{7a}$, and $R^{7b}$ are each independently selected from the group consisting of H or hydrocarbyl with 1 to 16 carbon atoms. That $R^5$—X—H is a heteroatom-containing functional group may simply mean that it contains X, which may be X is a heteroatom or heteroatom-containing group.

Preferably, X is a heteroatom or heteroatom-containing group selected from the group consisting of: —O—, —S—, —$NR^{6a}$—, —$CO_2$—, —C(=O)—, —C(=S)S—, —C(=O)S—, —C(=S)O—, —C(=O)N($R^{6a}$)—, —C(=$NR^{6a}$)O—, —C(=$NR^{6a}$)N($R^{6b}$)—, —C(=$NR^{6b}$)N ($R^{6a}$)—, —C(=S)N($R^{6a}$)—, —C(=$NR^{6a}$)S—, —$CH_2$C ($R^{6a}$)=C($OR^{6b}$)O—, —$CH_2$C($R^{6a}$)=C($NR^{6b}R^{6c}$)O—, —$CH_2$C($R^{6a}$)=P($OR^{6b}OR^{6c}$)O—, —C($R^{6a}$)=N—, —C($R^{6a}$)$R^{6b}$C($R^{6c}$)$R^{6d}$O—, —C($R^{6a}$)$R^{6b}$C($R^{6c}$)

$R^{6d}NR^{6e}$—, —C(═O)—$R^{6a}$—C(═O)O—, —C($R^{6b}R^{6c}$)N($R^{6a}$)—, —S(═O)$_2$O—, —C($R^{6a}$)($R^{6b}$)O—.

Preferably, said heteroatom from said heteroatom-containing group X is chosen from —O—, —S—, —$NR^{6a}$—, —$CO_2$—, or one or more combinations thereof. Most preferably X is —O— or —$CO_2$—.

Preferably, $R^{6a}$, $R^{6b}$, $R^{6c}$, $R^{6d}$, $R^{6e}$ are each independently selected from the group consisting of H or hydrocarbyl with 1 to 16 carbon atoms.

In a preferred embodiment, the compound according to Formula I-B is a hydroxyl- or carboxylic acid-bearing α-olefin or hydroxyl- or carboxylic acid-functionalized ring-strained cyclic olefin monomer, preferably a hydroxyl or carboxylic acid olefin monomer.

Hydroxyl-bearing α-olefin monomers may correspond for example to Formula I-B wherein $R^2$, $R^3$, and $R^4$ are each H and wherein X is —O— and wherein $R^5$ is either $C(R^{7a})(R^{7b})$ or a plurality of $C(R^{7a})(R^{7b})$ groups, wherein $R^{7a}$, and $R^{7b}$ are each independently selected from the group consisting of H or hydrocarbyl with 1 to 16 carbon atoms. An example of an $R^5$ group is $(CH_2)_9$.

Preferred monomers are selected from the group of allyl alcohol, 3-buten-1-ol, 3-buten-2-ol, 5-hexene-1-ol and 10-undecene-1-ol.

Hydroxyl-functionalized ring-strained cyclic olefins (also called internal olefins) may be for example typically hydroxyl-functionalized norbornenes, preferably 5-norbornene-2-methanol. They correspond to Formula I-B wherein $R^2$ and $R^4$ are H and $R^3$ and $R^5$ together for a ring structure that is functionalized with X—H, wherein X is —O—.

Carboxylic acid-bearing α-olefin monomers may for example correspond to Formula I-B wherein $R^2$, $R^3$, and $R^4$ are each H and wherein X is —$CO_2$— and wherein $R^5$ is either —$C(R^{7a})(R^{7b})$— or a plurality of —$C(R^{7a})(R^{7b})$— groups, wherein $R^{7a}$, and $R^{7b}$ are each independently selected from the group consisting of H or hydrocarbyl with 1 to 16 carbon atoms. An example of an $R^5$ group is —$(CH_2)_8$—. Preferred monomers are selected from the group of allyl carboxylic acid or butenyl carboxylic acid or undecenoic acid.

The hydrogen atoms directly bound to X in the second, functionalized, olefin monomer can have an acidic nature to the highly reactive catalyst. In case such acidic hydrogen atoms are present, a masking agent is preferably used, which can react with the acidic hydrogen, and directly bind to the monomer comprising the polar group. This reaction will prevent a reaction of the polar group (—X—H) with the catalyst.

The molar amount of masking agent preferably is at least the same molar amount as monomer of formula (I) used in the process according to the invention. Preferably the molar amount of masking agent is at least 10% higher than the molar amount of monomer of formula (I), or at last 20% higher. Typically the amount of masking agent is less than 500% of monomer according to formula (I).

Examples of masking agents are silyl halides, trialkyl aluminum complexes, dialkyl magnesium complexes, dialkyl zinc complexes or trialkyl boron complexes. Preferred complexes are trialkyl aluminum complexes. Preferably these trialkyl aluminum complexes have bulky substituents, like for example isobutyl groups.

Metal catalyst and/or catalyst precursor suitable for the process according to the invention.

In the section below several examples for single-site catalysts or single-site catalyst precursors, which may be used to prepare the metal catalyst according to the present invention, are specified. Metal catalysts that are suitable may be obtained by reacting the metal catalyst precursors with a co-catalyst either prior to the use in the polymerization or by in situ reaction with a co-catalyst.

A single-site-catalyst may be a catalyst that contains a single, catalytically active, metal center. Preferably, a single-site catalyst according to the invention may be a compound according to formula (I) or formula (II). The metal atom has an open coordination site where it binds olefinic monomers, which are subsequently polymerized. Single-site catalysts include those found in *Chem. Rev.* 2000, 100, 1167-1682. A special case of single-site catalysts forms the multinuclear catalysts consisting of different but well-defined (single-site) catalytic sites within one and the same catalyst molecule. Examples of such multinuclear catalysts can be found in *Chem. Rev.* 2011, 111, 2450-2485.

Examples of single-site catalysts may be metallocene catalysts. Typically, a metallocene catalyst refers to a sandwich complex comprising a transition metal, group 3 metal or lanthanide coordinated to two members of five-member carbon ring, i.e. substituted cyclopentadienyl (Cp), heterosubstituted five- or six-membered aromatic ring, or a bridged (ansa) ligand consisting of five-member carbon rings and/or hetero-substituted five- or six-membered aromatic rings.

Other examples of single-site catalysts are half-metallocenes. Half-metallocene catalysts in the present description may mean especially for example: a metal catalyst or catalyst precursor typically consisting of one five-member carbon ring, i.e. substituted cyclopentadienyl (Cp), heterosubstituted five- or six membered aromatic ring, bound to a metal active site.

Other examples of single-site catalysts are post-metallocenes. Post-metallocene catalysts in the present description may mean especially for example: a metal catalyst that contains no substituted cyclopentadienyl (Cp) ligands, but may contains one or more anions bound to the metal active site, typically via a heteroatom.

Examples of half-metallocene and post-metallocene catalysts can for example be found in *Chem. Rev.* 2003, 103, 283-315 and *Angew. Chem. Int. Ed.* 2014, 53, 9722-9744.

In the single-site catalyst according to the invention the transition metal is not present in its highest oxidation state, but in a lower oxidation state. The "oxidation state" of an atom in a molecule gives the number of valence electrons it has gained or lost. The highest oxidation state of titanium is +4 and of chromium is +6. These metals can be present in the catalyst used in the process according to the present invention in a lower oxidation state: Titanium preferably as Ti+3, chromium as Cr+3. This may contribute to reduce the catalyst's sensitivity to poisoning by nucleophilic functions of the comonomer.

The single-site catalyst according to the invention is a compound of formula (I) or formula (II).

(I)

(II)

In the compound of formula (I)

$M^1$ is titanium or chromium, preferably in a trivalent oxidation state;

the substituents X, equal to or different from each other, are monoanionic sigma ligands selected from the group consisting of hydrogen, halogen, $R^8$, $OR^8$, $OCOR^8$, $SR^8$, $NR^8_2$ and $PR^8_2$, wherein $R^8$ equal to or different from each other are hydrogen or $C_1$-$C_{40}$ hydrocarbyl radicals optionally containing one or more heteroatoms belonging to groups 13-17 of the Periodic Table of the Elements; preferably $R^8$ are hydrogen atom, linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl, or $C_7$-$C_{20}$-arylalkyl radicals optionally containing silicon atoms; preferably X is an halogen atom or a hydrocarbyl radical; more preferably X is chlorine or a $C_1$-$C_{10}$ alkyl radical, such as a methyl or an ethyl radical; n ranges from 0 to 3; preferably n is 2.

$L^1$ is a divalent bridge connecting the two nitrogen atoms; the bonds connecting the two nitrogen atoms with the bridge $L^1$ can be single bonds or double bonds; preferably $L^1$ is a divalent $C_1$-$C_{40}$ hydrocarbon group optionally containing one or more heteroatoms belonging to groups 13-17 of the Periodic Table of the Elements; $R^9$, equal to or different from each other are $C_1$-$C_{40}$ hydrocarbyl radicals optionally containing one or more heteroatoms belonging to groups 13-17 of the Periodic Table of the Elements; preferably $R^9$ are hydrogen atom, linear or branched, cyclic or acyclic, $C_1$-$C_{20}$-alkyl $C_2$-$C_{20}$ alkenyl $C_2$-$C_{20}$ alkynyl $C_6$-$C_{20}$-aryl $C_7$-$C_{20}$-alkylaryl or $C_7$-$C_{20}$-arylalkyl radicals optionally containing silicon atoms;

m ranges from 0 to 2; when m is 0 the group $T^1$ does not exist;

$T^1$ is a Lewis base such as tetrahydrofuran, tertiary amine, pyridine, pyrrole, furan, thiophene and the like. The group $T^1$ can also be bonded to the group $R^9$.

Preferably the compound of formula (I) has formulas (Ia) and (Ib) wherein $R^1$, $T^1$, $M^1$, X, m and n have been described above;

(Ia)

(Ib)

$R^{10}$ equal to or different from each other are hydrogen or $C_1$-$C_{40}$ hydrocarbyl radicals optionally containing one or more heteroatoms belonging to groups 13-17 of the Periodic Table of the Elements; preferably $R^{10}$ are hydrogen atom, linear or branched, cyclic or acyclic, $C_1$-$C_{20}$-alkyl $C_2$-$C_{20}$-alkenyl $C_2$-$C_{20}$-alkynyl $C_6$-$C_{20}$-aryl $C_7$-$C_{20}$-alkylaryl, $C_7$-$C_{20}$-arylalkyl radicals or an amine $NR^9_2$ wherein $R^9$ is as described above;

$R^{11}$ is a divalent group selected from $C_1$-$C_{20}$-alkylidene, $C_3$-$C_{20}$-cycloalkylidene, $C_6$-$C_{20}$-arylidene, $C_7$-$C_{20}$-alkylarylidene, or $C_7$-$C_{20}$-arylalkylidene radicals optionally containing heteroatoms belonging to groups 13-17 of the Periodic Table of the Elements, and silylidene radical containing up to 3 silicon atoms; preferably $R^{11}$ is a $C_1$-$C_{20}$ alkylidene radical; more preferably it is an ethylidene or a propylidene radical;

$T^2$ is an $OR^8$, $SR^8$, $NR^8$ or an $NR^8_2$ radical wherein $R^8$ is as described above; preferably $T^1$ is tetrahydrofuran, a tertiary amine, pyridine or pyrrole; preferably n is 2 and preferably m is 1.

In the compound of formula (II) above $M^1$ is titanium or chromium, preferably in a trivalent oxidation state;

X has been described above;

$R^{12}$, $R^{13}$, $R^{14}$ and $R^{15}$, equal to or different from each other, are hydrogen atoms halogen atoms, or $C_1$-$C_{40}$ hydrocarbon radicals optionally containing one or more heteroatoms belonging to groups 13-17 of the Periodic Table of the Elements; or two adjacent $R^{12}$, $R^{13}$, $R^{14}$ and $R^{15}$ may form one or more $C_3$-$C_7$-membered ring optionally containing heteroatoms belonging to groups 13-17 of the Periodic Table of the Elements; preferably $R^{12}$, $R^{13}$, $R^{14}$ and $R^{15}$, equal to or different from each other, are hydrogen atoms, halogen atoms or linear or branched cyclic or acyclic, $C_1$-$C_{20}$-alkyl $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing silicon atoms; or two adjacent $R^{12}$, $R^{13}$, $R^{14}$ and $R^{15}$ can form one or more $C_3$-$C_{07}$ membered ring;

$L^2$ is a divalent bridging group selected from $C_1$-$C_{20}$ alkylidene, $C_3$-$C_{20}$ cycloalkylidene, $C_6$-$C_{20}$ arylidene $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably $L^2$ is a divalent group $(ZR^{16}_{m1})_{n1}$; Z being C, Si, Ge, N or P, and the $R^{16}$ groups, equal to or different from each other, being hydrogen or hydrocarbon groups containing from 1 to 20 carbon atoms, or two $R^{16}$ can form an aliphatic or aromatic $C_4$-$C_7$ ring; preferably $R^{16}$ is hydrogen or a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radical; more preferably $L^2$ is selected from $SiMe_2$, $SiPh_2$, $SiPhMe$, $SiMe(SiMe_3)$, $CH_2$, $(CH_2)_2$, $(CH_2)_3$ or $C(CH_3)_2$; m1 is 1 or 2, and more specifically it is 1 when Z is N or P and it is 2 when Z is C, Si or Ge; n1 is an integer ranging from 1 to 4; preferably it is 1 or 2;

$A^1$ is optional group, when $A^1$ is absent $L^2$ may be a hydrogen or a hydrocarbyl, especially a methyl or ethyl group. When $A^1$ is present, than $A^1$ may be a Lewis basic functionality like an $NR^8$, $NR^8_2$, an $OR^8$ or a $SR^8$ group, wherein $R^8$ is as described above; $R^8$ can also be connected to $L^2$ forming an aliphatic or aromatic ring or heterocyclic structure; more preferably $R^8$ is a $C_1$-$C_{20}$-alkyl radical such as a methyl or an ethyl radical; preferably $A^1$ is an $NR^8$ or $NR^8_2$ group.

According to the invention, said catalyst precursor of formula (II) can for example be so-called post-metallocene catalysts or catalyst precursors; more preferably amidinato and guanidinato complexes.

Non-limiting examples of post-metallocene metal catalyst precursors according to the present invention are: {N',N''-bis[2,6-di(1-methylethyl)phenyl]-N,N-diethylguanidinato} metal dichloride, {N',N''bis[2,6-di(1-methylethyl)phenyl]-N-methyl-N-cyclohexylguanidinato} metal dichloride, {N',N''-bis[2,6-di(1-methylethyl)phenyl]-N,N-pentamethyleneguanidinato} metal dichloride, {N',N''-bis[2,6-di(methyl)phenyl]-sec-butyl-aminidinato} metal dichloride, {N,N'-bis(trimethylsilyl)benzamidinato} metal dichloride, {N-trimethylsilyl,N'-(N'',N''-dimethylaminomethyl)benzamidinato} metal dichloride and their THF or other Lewis base adducts, where metal is titanium or chromium.

According to the invention, said catalyst precursor of formula (II) can be for example a so-called half-metallocene, even more preferably, $[(C_5H_4)CH_2CH_2N(Me)_2]MCl_2$, $[(C_5Me_4)CH_2CH_2N(Me)_2]MCl_2$, $[(C_5H_4)CH_2CH_2N(i-Pr)_2]MCl_2$, $[(C_5Me_4)CH_2CH_2N(i-Pr)_2]MCl_2$, $[(C_5H_4)CH_2CH_2N(n-Bu)_2]MCl_2$, $[(CsMe_4)CH_2CH_2N(n-Bu)_2]MCl_2$, $[(C_9H_6)CH_2CH_2N(Me)_2]MCl_2$, $[(C_9H_6)CH_2CH_2N(i-Pr)_2]MCl_2$, $[(C_5Me_4)C_9H_6N]MCl_2$, $[(C_5Me_3(SiMe_3))C_9H_6N]MCl_2$, $[(C_9H_6)C_9H_6N]MCl_2$, $[(C_5Me_4)CH_2C_5H_4N]MCl_2$ or $[(C_9H_6)CH_2C_5H_4N]MCl_2$, where M is titanium or chromium.

Other suitable metal catalyst precursors can be also the trivalent transition metal as those described in WO 9319104 (for example see especially example 1, page 13, line 15) or in WO 9613529 (for example see especially example III, page 20, line 10-13) or in WO 97142232 and WO 9742236 (for example see especially example 1, page 26, line 14).

Other non-limiting examples of metal catalyst precursors that would be suitable according to the present invention are: (pyrrolidinyl)ethyl-tetramethylcyclopentadienyl titanium dichloride, (N,N-dimethylamino)ethyl-fluorenyl titanium dichloride, (bis(1-methyl-ethyl)phosphino)ethyl-tetramethylcyclopentadienyl titanium dichloride, (bis(2-methyl-propyl)phosphino)ethyl-tetramethylcyclopentadienyl titanium dichloride, (diphenylphosphino)ethyl-tetramethylcyclopentadienyl titanium dichloride, (diphenylphosphino)methyldimethylsilyl-tetramethylcyclopentadienyl titanium dichloride. Other examples are the catalysts wherein the metal is trivalent trivalent chromium.

In a preferred embodiment of the invention, the catalyst (precursors) are selected from the group consisting of $[(C_5Me_4)CH_2CH_2N(Me)_2]MCl_2$, $[(CsMe_4)CH_2CH_2N(n-Bu)_2]MCl_2$, $[(C_5Me_4)C_9H_6N]MCl_2$ and $[(CsMe_3(SiMe_3))C_9H_6N]MCl_2$, where M is titanium or chromium.

Co-Catalysts

A co-catalyst can be used when a metal catalyst precursor is applied. The function of this co-catalyst is to activate the metal catalyst precursor. Co-catalysts may be selected for example from the group consisting of aluminum alkyls and aluminum alkyl halides, such as for example triethyl aluminum (TEA) or diethyl aluminum chloride (DEAC), MAO, DMAO, MMAO, SMAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. $B(R')_y$ wherein R' is a fluorinated aryl and y is 3 or 4, respectively). Examples of a fluorinated borane is $B(C_6F_5)_3$ and of fluorinated borates are $[X]+[B(C_6F_5)_4]^-$ (e.g. $X=Ph_3C$, $C_6H_5N(H)Me_2$).

For example, the co-catalyst can be an organometallic compound. The metal of the organometallic compound can be selected from Group 1, 2, 12 or 13 of the IUPAC Periodic Table of Elements. Preferably, the co-catalyst is an organoaluminum compound, more preferably an aluminoxane, said aluminoxane being generated by the reaction of a trialkyl aluminum compound with water to partially hydrolyze said aluminoxane. For example, trimethyl aluminum can react with water (partial hydrolysis) to form methylaluminoxane (MAO). MAO has the general formula $(Al(CH_3)_{3-n}O_{0.5n})_x$. $(AlMes)_y$ having an aluminum oxide framework with methyl groups on the aluminum atoms.

MAO generally contains significant quantities of free trimethyl aluminum (TMA), which can be removed by drying the MAO to afford the so-called depleted MAO or DMAO. Supported MAO (SMAO) may also be used and may be generated by the treatment of an inorganic support material, typically silica, by MAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Neutral Lewis acid modified polymeric or oligomeric aluminoxanes may also be used, such as alkylaluminoxanes modified by addition of a C1-30 hydrocarbyl substituted Group 13 compound, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

Other examples of polymeric or oligomeric aluminoxanes are tri(isobutyl) aluminum- or tri(n-octyl) aluminum-modified methylaluminoxane, generally referred to as modified methylaluminoxane, or MMAO. In the present invention, MAO, DMAO, SMAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., Chem. Rev. 2000, 100, 1391. Suitable alkylating agents are trialkyl aluminum compounds, preferably TIBA. Suitable cation forming agents for use herein include (i) neutral Lewis acids, such as C1-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl)boron compounds, and most preferably tris(pentafluorophenyl) borane, (ii) non polymeric, compatible, non-coordinating, ion forming compounds of the type $[C]^+[A]^-$ where "C" is a cationic group such as ammonium, phosphonium, oxonium, silylium or sulfonium groups and $[A]^-$ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported catalyst may also be used, for example using SMAO as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO. Co-catalysts may thereby be main group metal compound(s) in the sense of the invention.

Scavengers

A scavenger can optionally be added in the catalyst system in order to react with impurities that are present in the polymerization reactor, and/or in the solvent and/or monomer feed. This scavenger prevents poisoning of the catalyst during the olefin polymerization process. The scavenger can be the same as the co-catalyst but can also independently be selected from the group consisting of aluminum hydrocarbyls (e.g. triisobutyl aluminum, trioctyl aluminum, trimethyl aluminum, MAO, MMAO, SMAO), zinc hydrocarbyls (e.g. diethyl zinc) or magnesium hydrocarbyls (e.g. dibutyl magnesium).

Polymerization of the Olefins

In the present invention the heteroatom-containing functions on the second type of olefin monomer can be in situ protected by the scavenger (or metal pacifying agent). In such cases, it may be preferred to add the scavenger (or part of the scavenger) with the functional group containing olefinic monomer prior to the polymerization. Preferably the amount of scavenger is at least one equivalent to the amount of functional olefinic monomer, or between 1 and 4 times the amount of functional olefinic monomer.

Polymerization of the olefins can for example be carried out in the gas phase below the melting point of the polymer. Polymerization can also be carried out in the slurry phase below the melting point of the polymer. Moreover, polymerization can be carried out in solution at temperatures above the melting point of the polymer product.

In the process to produce olefin polymers, the polymerization conditions, like for example temperature, time, pressure, monomer concentration can be chosen within wide limits. The polymerization temperature is in the range from −100 to 300° C., preferably 0 to 250° C., more preferably 40 to 200° C. The polymerization time is in the range of from 10 seconds to 20 hours, preferably from 1 minute to 10 hours, more preferably from 5 minutes to 5 hours. The ethylene pressure during polymerization is in the range from 1 to 500 bar, preferably from 1 to 250 bar, most preferably from 1 to 100 bar. The molecular weight of the polymer can be controlled by use of hydrogen or other chain transfer agents like silanes, boranes, zinc alkyls or excess aluminum alkyl species in the polymerization. Conversely, adding sterically hindered phenols such as BHT might lead to an increase in molecular weight and/or higher comonomer incorporation. The polymerization may be conducted by a batch process, a semi-continuous process or a continuous process and may also be conducted in two or more steps of different polymerization conditions. The polyolefin produced is separated from the polymerization solvent and dried by methods known to a person skilled in the art.

In an embodiment, a hindered phenol, such as for example butylhydroxytoluene (BHT), may be added during the polymerization process, especially for example in an amount between 0.1 and 5 mol. equivalents of main group metal compound(s), which may especially for example be co-catalyst(s), and/or catalyst(s). A hindered phenol may be a phenol with a substituted aromatic ring, preferably with at least two alkyl substituents, further preferred with three alkyl substituents, whereby preferably at least one or both substituents on the positions adjacent to the alcohol comprise at least two or further preferred at least 3 carbon atoms, whereby such substituents especially include tert-butyl groups. This may contribute to increase molecular weight and/or comonomer incorporation.

Copolymers comprising between 70 mol. % and <100 mol. %, preferably between 80 mol. % and 99.99 mol. %, further preferred 90 mol. % and 99.98 mol. % of ethylene and/or propylene and between 30 mol. % and >0 mol. %, preferably between 20 mol. % and 0.01 mol. %, further preferred between 10 mol. % and 0.02 mol. % of a polar monomer. For example polymer comprising between 0.05 and 100, preferably 0.1 and 50 polar branches per 1000 C atoms.

The copolymers prepared according to the present invention may for example be used to introduce polar properties to enhance the interfacial interactions in polyolefins blends with polar polymers or blends with different polyolefins with PEs. They may be used as compatibilizers to improve properties such as adhesion. They may be used to improve barrier properties, especially against oxygen, for polyolefin films. They may be used as compatibilizers to highly polar polymers such as starch or for polyolefin-based composites with inorganic fillers such as glass or talc. They may be used in drug delivery devices, nonporous materials/membranes.

The polyolefins of the invention may be suitable as macroinitiators for producing graft copolymers, which can possibly be used as compatibilizers for polyolefin-based blends as describe for example in WO 2016097204 A1 and WO 2016097207 A1.

EXAMPLES

The invention is further illustrated by the following non-limiting examples merely used to further explain certain embodiments of the present invention.

Experimental Section

General Considerations.

All manipulations were performed under an inert dry nitrogen atmosphere using either standard Schlenk or glove box techniques. Dry, oxygen-free toluene was employed as solvent for all polymerizations. 10-undecene-1-ol, 5-hexen-1-ol, 3-buten-1-ol, 3-buten-2-ol and allyl alcohol were purchased from Sigma Aldrich and dried with 4-A molecular sieves under an inert atmosphere. Methylaluminoxane (MAO, 30 wt. % solution in toluene) was purchased from Chemtura. Triisobutyl aluminum (TiBA, 1.0 M solution in hexanes) purchased from Aldrich. 2,6-bis(1,1-dimethylethyl)-4-methylphenol (BHT) was purchased from Fisher Scientific. Catalysts 1 ([C$_5$Me$_4$CH$_2$CH$_2$NMe$_2$]TiCl$_2$) was prepared according to the method described in WO97/42232. Catalyst 2 (CsMe$_4$(SiMe$_2$NtBu)TiCl$_2$) was prepared according to literature procedure described in Organometallics 1990, 9, 867-869 and Chem. Ber. 1990, 123, 1649-1651. Catalyst 3 (Cp(tBu$_3$P=N)TiCl$_2$) was prepared according to Organometallics 2005, 24, 2548-2560. Catalysts [Et$_2$NC(N (2,6-iPr$_2$—C$_6$H$_3$)]TiCl$_3$, [2,4-(t-Bu)2,-6-(CH=NC$_6$F$_5$) C$_6$H$_2$O]$_2$TiCl$_2$ and rac-Me$_2$Si(2-Me-4-Ph-Ind)$_2$ZrCl$_2$ were purchased from MCAT GmbH, Konstanz, Germany.

Randomly Functionalized PE (Entry 3, Table 1).

The reaction was carried out in a stainless steel Büchi reactor (300 mL). Prior to the polymerization, the reactor was dried in vacuo at 40° C. and flushed with dinitrogen. Toluene solvent (90 mL) was introduced followed by TiBA (1.0 M solution in hexanes, 20 mmol) and the functional monomer 10-undecene-1-ol (neat solution, 2 mL, 10 mmol) under an inert atmosphere. The resulting solution was stirred for 30 min followed by the addition of MAO cocatalyst (30 wt. % solution in toluene, 2.6 mL) under dinitrogen atmosphere. The polymerization reaction was started by the injection of the catalyst (6.2 mL of a catalyst solution in toluene 1 mg·mL$^{-1}$) into the reactor under dinitrogen atmosphere. The reactor was then pressurized to the desired pressure with ethylene (2.5 bars) and the pressure was maintained constant for 15 min. The ethylene feed was closed and the polymerization was quenched by pouring the mixture into an Erlenmeyer containing acidified methanol (5 w. %, 500 mL). The resulting suspension was filtered and thoroughly washed with demi-water and dried under reduced pressure at 60° C. for 24 hours to determine the yield. Similar procedure was applied in ethylene copolymerization with other hydroxyl alpha-olefins (allyl alcohol, 5-hexen-1-ol, 3-buten-1-ol and 3-buten-2-ol).

Analytical techniques.

$^1$H NMR Characterization.

The percentage of functionalization was determined by $^1$H NMR analysis carried out at 130° C. using deuterated tetrachloroethane (TCE-d$_2$) as the solvent and recorded in 5 mm tubes on a Varian Mercury spectrometer operating at a frequency of 400 MHz. Chemical shifts are reported in ppm versus tetramethylsilane and were determined by reference to the residual solvent protons.

High Temperature Size Exclusion Chromatography (HT-SEC).

The molecular weight in g/mol and the PDI were determined by means of high temperature size exclusion chromatography which was performed at 160° C. using a high speed GPC (Freeslate, Sunnyvale, USA). Detection: IR4 (PolymerChar, Valencia, Spain). Column set: three Polymer Laboratories 13 μm PLgel Olexis, 300×7.5 mm. 1,2,4-Trichlorobenzene (TCB) was used as eluent at a flow rate of 1 mL·min$^{-1}$. TCB was freshly distilled prior to use. The molecular weights and the corresponding PDI were calculated from HT-SEC analysis with respect to narrow polyethylene standards (PSS, Mainz, Germany).

Differential Scanning Calorimetry (DSC).

Thermal analysis was carried out on a DSC Q100 from TA Instruments at a heating rate of 5° C.min$^{-1}$. First and second runs were recorded after cooling down to ca. −20° C. The melting temperatures reported correspond to second runs.

TABLE 1

Randomly functionalized polyethylene-co-C$_{11}$-OH using single-site catalysts.

| # | catalyst | MAO Al:cat | C$_{11}$-OH/ cat. | Temp ° C. | BHT (eq. to MAO) | activity[b] (kg/mol. h) | M$_n$ (kg/mol) (PDI)[c] | branch/ 1000 C. |
|---|---|---|---|---|---|---|---|---|
| 1 | 1 | 600 | 0 | 40 | 0 | 1108 | 4.1 | — |
| 2 | 1 | 600 | 125 | 40 | 0 | 1350 | 2.5 | 2.0 |
| 3 | 1 | 600 | 500 | 40 | 0 | 1550 | 2.2 | 3.5 |
| 4 | 1 | 600 | 750 | 40 | 0 | 1620 | 1.9 | 5.9 |
| 5 | 1 | 600 | 1000 | 40 | 0 | 1720 | 0.9 | 23.2 |
| 6 | 1 | 700 | 500 | 40 | 1.0 | 950 | 26.2 | 15 |
| 7 | 1 | 700 | 500 | 40 | 2.0 | 425 | 92.9 | 27 |
| 8 | Comparative 1 | 1000 | 0 | 40 | 0 | 2027 | 44.7 | — |
| 9 | Comparative 1 | 1000 | 250 | 40 | 0 | 1480 | 17.2 | 7.0 |
| 10 | Comparative 1 | 1000 | 500 | 40 | 0 | 0 | 16.4 | — |
| 11 | Comparative 1 | 1000 | 1000 | 40 | 0 | 0 | — | — |
| 12 | Comparative 2 | 1000 | 0 | 40 | 0 | 2970 | — | — |
| 13 | Comparative 2 | 1000 | 250 | 40 | 0 | 1944 | 17.6 | 0.9 |
| 14 | Comparative 2 | 1000 | 500 | 40 | 0 | 0 | — | — |
| 15 | Comparative 3 | 1000 | 0 | 40 | 0 | 1776 | — | — |
| 16 | Comparative 3 | 1000 | 250 | 40 | 0 | 940 | 33.4 | 5.0 |
| 17 | Comparative 3 | 1000 | 500 | 40 | 0 | 0 | — | — |
| 18 | Comparative 3 | 1000 | 1000 | 40 | 0 | 0 | — | — |
| 19 | 2 | 1000 | 0 | 40 | 0 | 1100 | — | — |
| 20 | 2 | 1000 | 250 | 40 | 0 | 1120 | — | — |
| 21 | 2 | 1000 | 500 | 40 | 0 | 1140 | — | — |
| 22 | 2 | 1000 | 1000 | 40 | 0 | 1783 | — | — |

Catalyst 1: Ti(III) = [C$_5$Me$_4$(CH$_2$CH$_2$NMe$_2$]TiCl$_2$

Catalyst 2: Cr(III) = [C$_5$Me$_4$(CH$_2$CH$_2$NMe$_2$]CrCl$_2$

Comparative 1: Ti(IV) Guanidinate = [Et$_2$NC(N(2,6-iPr$_2$—C$_6$H$_3$)]TiCl$_3$ Comparative 2: Ti(IV) Fl = [2,4-(t-Bu)2,-6-(CH=NC$_6$F$_5$)C$_6$H$_2$O]$_2$TiCl$_2$ Comparative 3: Zirconocene = rac-Me$_2$Si(2-Me-4-Ph-Ind)$_2$ZrCl$_2$ The series of polymerizations of Table 1 with ethylene and 10-undecene-1-ol has been carried out with a number of different catalysts as mentioned above. They contain different metals (Ti, Cr, Zr) in different oxidation states.

Figure 1:
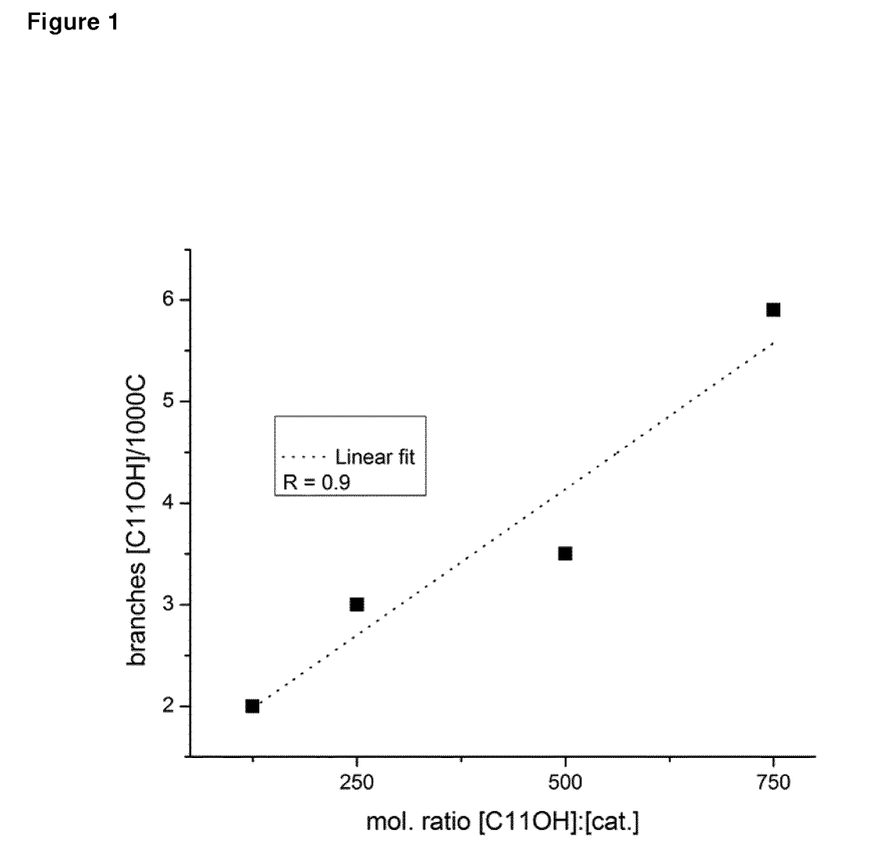
FIG. 1 shows the incorporation of $C_1$=OH as a function of the feed concentration of $C_{11}$=OH.
Figure 2:
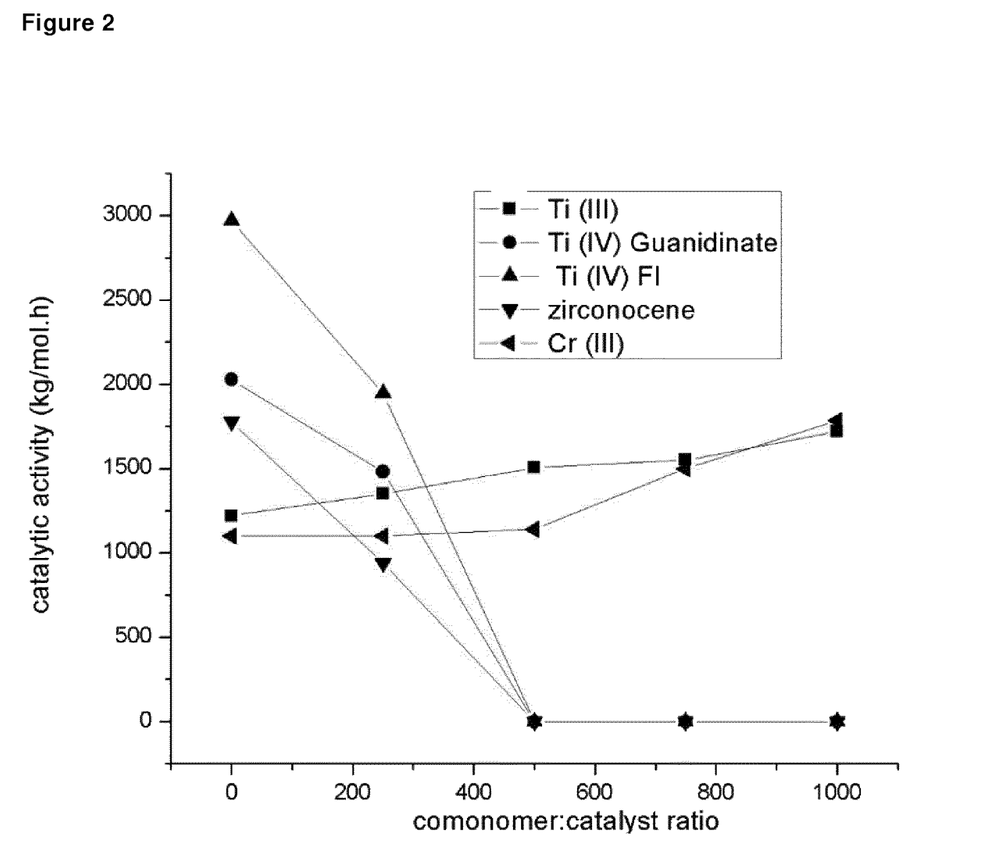
FIG. 2 shows the activity as a function of the nucleophilic comonomer to catalyst ratio for different trivalent and tetravalent catalysts.

For both the Cr(III) and Ti(III) catalyst activity increases with increase of nucleophilic comonomer, while all other catalysts are poisoned due to its presence, despite protecting the OH of the polar comonomer with an Al alkyl compound. For results see FIG. 2.

TABLE 2

Ethylene/allyl alcohol copolymerization using catalysts 1 and 4.

| Run # | Cat. | TiBA:allyl alcohol | allyl alcohol mmol | Yield (g) |
|---|---|---|---|---|
| 1 | 1 | 3.0 | ref | 6.1 |
| 2 | 1 | 3.0 | ref | 6.2 |
| 5 | 1 | 3.0 | 1 | 6.3 |
| 6 | 1 | 3.0 | 5 | 8.1 |
| 7 | 1 | 3.0 | 15 | 6.9 |
| 8 | Comparative 4 | 3.0 | ref | 5.2 |
| 9 | Comparative 4 | 3.0 | 5 | 1.2 |
| 10 | Comparative 4 | 3.0 | 10 | Traces |
| 11 | Comparative 4 | 3.0 | 15 | Traces |

Conditions: toluene (80 mL); ethylene: 2.5 bar; MAO (30 wt. % in toluene) = 2.2 mL; Al/Ti = 1000; time: 15 min; 40° C.; cat. = 20 μmol.
Catalyst 1: trivalent titanium [C$_5$Me$_4$CH$_2$CH$_2$NMe$_2$]TiCl$_2$.
Comparative 4: comparative examples with tetravalent titanium phosphinimide Cp(tBu$_3$P=N)TiCl$_2$.

TABLE 3

Ethylene/3-buten-2-ol copolymerization using catalyst 1.

| Run # | TiBA:3-buten-2-ol | 3-buten-2-ol mmol | Yield (g) |
|---|---|---|---|
| 1 | 3.0 | ref | 6.1 |
| 2 | 3.0 | ref | 6.2 |
| 3 | 3.0 | ref | 5.7 |
| 4 | 3.0 | 0.5 | 5.1 |
| 5 | 3.0 | 5 | 8.1 |
| 6 | 3.0 | 10 | 7.3 |

Conditions: toluene (80 mL); ethylene: 2.5 bar; MAO (30 wt. % in toluene) = 2.2 mL; Al/Ti = 1000; time: 15 min; 40° C.; cat. = 20 μmol.
Catalyst 1: trivalent titanium [C$_5$Me$_4$CH$_2$CH$_2$NMe$_2$]TiCl$_2$.

TABLE 4

Ethylene/3-buten-1-ol copolymerization using catalyst 1.

| Run # | TiBA:3-buten-1-ol | 3-buten-1-ol mmol | Yield (g) |
|---|---|---|---|
| 1 | 3.0 | ref | 6.1 |
| 2 | 3.0 | 0.1 | 5.8 |
| 3 | 3.0 | 0.5 | 6.4 |
| 4 | 3.0 | 1.0 | 6.2 |
| 5 | 3.0 | 5.0 | 8.6 |
| 6 | 3.0 | 10.0 | 6.9 |
| 7 | 3.0 | 15.0 | 9.8 |
| 8 | 3.0 | 20.0 | 7.6 |

Conditions: toluene (80 mL); ethylene: 2.5 bar; MAO (30 wt. % in toluene) = 2.2 mL; Al/Ti = 1000; time: 15 min; 40° C.; cat. = 20 μmol.
Catalyst 1: trivalent titanium [C$_5$Me$_4$CH$_2$CH$_2$NMe$_2$]TiCl$_2$.

TABLE 5

Ethylene/5-hexen-1-ol copolymerization using catalyst 1.

| Run # | TiBA:5-hexen-1-ol | 5-hexen-1-ol mmol | Yield (g) |
|---|---|---|---|
| 1 | 3.0 | ref | 6.1 |
| 2 | 3.0 | ref | 6.2 |
| 3 | 3.0 | 0.5 | 4.9 |
| 4 | 3.0 | 1.0 | 6.1 |
| 5 | 3.0 | 5.0 | 7.5 |
| 6 | 3.0 | 10.0 | 8.9 |
| 7 | 3.0 | 15.0 | 5.6 |
| 8 | 3.0 | 20.0 | 10.5 |

Conditions: toluene (80 mL); ethylene: 2.5 bar; MAO (30 wt. % in toluene) = 2.2 mL; Al/Ti = 1000; time: 15 min; 40° C.; cat. = 20 μmol.
Catalyst 1: trivalent titanium [C$_5$Me$_4$CH$_2$CH$_2$NMe$_2$]TiCl$_2$.

The invention claimed is:
1. A process comprising copolymerizing at least one olefin monomer and at least one functionalized olefin monomer with a catalyst system to obtain a polyolefin main chain having one or multiple functionalized short chain branches, the catalyst system comprising:
   i) a single-site catalyst or catalyst precursor comprising a metal selected from Ti3+ or Cr3+;
   ii) a co-catalyst;
   iii) optionally a scavenger,
wherein the molar ratio of the functionalized olefin monomer to catalyst is at least 300.

2. The process according to claim 1, wherein the first olefin monomer has the following structure according to Formula I-A:

(I-A)

wherein C is carbon and wherein $R^{1a}$, $R^{1b}$, $R^{1c}$, and $R^{1d}$ are each independently selected from the group consisting of H and hydrocarbyl with 1 to 16 carbon atoms.

3. The process according to claim 1, wherein the first olefin monomer is selected from ethylene or propylene.

4. The process according to claim 1, wherein the functionalized olefin monomer has the following structure according to Formula I-B:

(I-B)

wherein C is carbon, wherein $R^2$, $R^3$, and $R^4$ are each independently selected from the group consisting of H and hydrocarbyl with 1 to 16 carbon atoms, wherein $R^5$—X—H is a heteroatom-containing functional group, $R^5$ is either —C($R^{7a}$)($R^{7b}$)— or a plurality of —C($R^{7a}$)($R^{7b}$)— groups, wherein $R^{7a}$ and $R^{7b}$ are each independently selected from the group consisting of H and hydrocarbyl with 1 to 16 carbon atoms.

5. The process according to claim 4, wherein said heteroatom from said heteroatom-containing group X is chosen from —O—, —S—, —NR$^{6a}$—, —CO$_2$— or one or more combinations thereof.

6. The process according to claim 1, wherein the functionalized monomers are selected from the group allyl alcohol, 3-buten-1-ol, 3-buten-2-ol, 5-hexene-1-ol, 10-undecene-1-ol, 5-norbornene-2-methanol and undecenoic acid.

7. The process according to claim 1, wherein the molar ratio of the second functionalized olefin monomer to catalyst is at least 500.

8. The process according to claim 1, wherein a scavenger is present, which is selected from trialkyl aluminum complexes.

9. The process according to claim 1, wherein a scavenger is present and wherein the molar amount of scavenger is at least the same molar amount of the functionalized olefin monomer.

10. The process according to claim 1, wherein the catalysts or catalyst precursors are selected from the group consisting the single-site catalysts according to Formula (I) and Formula (II), wherein in the compound of Formula (I)
- $M^1$ is titanium or chromium;
- each of the substituents X, which are the same as or different from each other, are monoanionic sigma ligands selected from the group consisting of hydrogen, halogen, $R^8$, $OR^8$, $OCOR^8$, $SR^8$, $NR^8_2$ and $PR^8_2$, wherein each $R^8$ is the same as or different from each other, and are hydrogen or $C_1$-$C_{40}$ hydrocarbyl radicals optionally containing one or more heteroatoms belonging to groups 13-17 of the Periodic Table of the Elements;
- $L^1$ is a divalent bridge connecting the two nitrogen atoms wherein the bonds connecting the two nitrogen atoms with the bridge $L^1$ is single bonds or double bonds;
- each $R^9$ is the same as or different from each other, and are $C_1$-$C_{40}$ hydrocarbyl radicals optionally containing one or more heteroatoms belonging to groups 13-17 of the Periodic Table of the Elements;
- m ranges from 0 to 2; when m is 0 the group $T^1$ does not exist;
- $T^1$ is a Lewis base he group $T^1$ can also be bonded to the group $R^9$; or wherein in the compound of Formula (II)
- $M^1$ is titanium or chromium;
- X is as in the compound of Formula (I);
- $R^{12}$, $R^{13}$, $R^{14}$ and $R^{15}$ are each the same as or different from each other, and are hydrogen atoms, halogen atoms, or $C_1$-$C_{40}$ hydrocarbon radicals optionally containing one or more heteroatoms belonging to groups 13-17 of the Periodic Table of the Elements; or two adjacent $R^{12}$, $R^{13}$, $R^{14}$ and $R^{15}$ form one or more $C_3$-$C_7$-membered ring optionally containing heteroatoms belonging to groups 13-17 of the Periodic Table of the Elements;
- $L^2$ is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and a silylidene radical containing up to 5 silicon atoms;
- $A^1$ is an optional group, and when $A^1$ is absent $L^2$ is a hydrogen or a hydrocarbyl, and when $A^1$ is present, then $A^1$ is a Lewis base functionality.

11. The process according to claim 1, wherein a hindered phenol is added in an amount of between 0.1 and 5 mol. equivalents of main group metal compound(s).

12. The process according to claim 10, wherein
in the compound of Formula (I),
- $M^1$ is titanium or chromium in a trivalent oxidation state;
- $R^8$ is a hydrogen atom, linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl, or $C_7$-$C_{20}$-arylalkyl radical optionally containing a silicon atom;
- n is 2;
- $L^1$ is a divalent $C_1$-$C_{40}$ hydrocarbon group optionally containing one or more heteroatoms belonging to groups 13-17 of the Periodic Table of the Elements;
- $R^9$ are hydrogen atom, linear or branched, cyclic or acyclic, $C_1$-$C_{20}$-alkyl $C_2$-$C_{20}$ alkenyl $C_2$-$C_{20}$ alkynyl $C_6$-$C_{20}$-aryl $C_7$-$C_{20}$-alkylaryl or $C_7$-$C_{20}$-arylalkyl radicals optionally containing silicon atoms;
- when $T^1$ is present, $T^1$ is tetrahydrofuran, tertiary amine, pyridine, pyrrole, furan, or thiophene; and in the compound of Formula (II),
- $M^1$ is titanium or chromium in a trivalent oxidation state;
- $R^8$ is the same as described in Formula (I);
- $R^{12}$, $R^{13}$, $R^{14}$ and $R^{15}$ are each the same as or different from each other, and are hydrogen atoms, halogen atoms or linear or branched cyclic or acyclic, $C_1$-$C_{20}$-alkyl $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing silicon atoms; or two adjacent $R^{12}$, $R^{13}$, $R^{14}$ and $R^{15}$ can form one or more $C_3$-$C_7$ membered ring;
- $L^2$ is a divalent group $(ZR^{16}_{m1})_{n1}$; Z being C, Si, Ge, N or P, and the $R^{16}$ groups are each the same or different from each other, wherein each $R^{16}$ group independently being hydrogen or a hydrocarbon group containing from 1 to 20 carbon atoms, or two $R^{16}$ can form an aliphatic or aromatic $C_4$-$C_7$ ring;
- m1 is 1 or 2;
- n1 is an integer ranging from 1 to 4;
- $A^1$ is present and is an $NR^8$, $NR^8_2$, $OR^8$ or an $SR^8$ group, wherein $R^8$ is as described in the compound of Formula (I) or $R^8$ is connected to $L^2$ forming an aliphatic or aromatic ring or heterocyclic structure.

13. The process according to claim 12, wherein
in Formula (I),
X is a halogen atom or a $C_1$-$C_{10}$ alkyl radical; and
in the Formula (II),
X is chlorine or a $C_1$-$C_{10}$ alkyl radical;

$R^{16}$ is hydrogen or a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radical;

m1 is 1;

n1 is 1 or 2; and $R^8$ is a $C_1$-$C_{20}$-alkyl radical.

14. The process according to claim 13, wherein in the compound of Formula (I),

X is chlorine or a methyl or an ethyl radical;

in the compound of Formula (II), $L^2$ is selected from $SiMe_2$, $SiPh_2$, SiPhMe, SiMe(SiMe$_3$), $CH_2$, $(CH_2)_2$, $(CH_2)_3$ or $C(CH_3)_2$; m1 is 1 or 2, and more specifically it is 1 when Z is N or P and it is 2 when Z is C, Si or Ge; and $A^1$ is an $NR^8$ or $NR^8{}_2$ group.

15. A process comprising copolymerizing under suitable reaction conditions at least one first type of olefin monomer and at least one second type of functionalized olefin monomer using a catalyst system to obtain a polyolefin main chain having one or multiple functionalized short chain branches, the catalyst system comprising:

i) a single-site catalyst or single-site catalyst precursor comprising a metal selected from Ti3+ or Cr3+;

ii) a co-catalyst;

iii) optionally a scavenger, wherein the molar ratio of the second type of functionalized olefin monomer to the catalyst is at least 300;

wherein the second type of functionalized olefin monomer has the following structure according to Formula I-B:

wherein C is carbon, wherein $R^2$, $R^3$, and $R^4$ are each independently selected from the group consisting of H or hydrocarbyl with 1 to 16 carbon atoms, wherein $R^5$—X—H is a heteroatom-containing functional group, $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H or hydrocarbyl with 1 to 16 carbon atoms;

wherein the single-site catalyst or single-site catalyst precursor is selected from the group consisting the single-site catalysts according to formula (I) or formula (II), wherein in the compound of formula (I)

$M^1$ is titanium or chromium;

the substituents X, equal to or different from each other, are monoanionic sigma ligands selected from the group consisting of hydrogen, halogen, $R^8$, $OR^8$, $OCOR^8$, $SR^8$, $NR^8{}_2$ and $PR^8{}_2$, wherein $R^8$ equal to or different from each other are hydrogen or $C_1$-$C_{40}$ hydrocarbyl radicals optionally containing one or more heteroatoms belonging to groups 13-17 of the Periodic Table of the Elements; n ranges from 0 to 3;

$L^1$ is a divalent bridge connecting the two nitrogen atoms; the bonds connecting the two nitrogen atoms with the bridge $L^1$ can be single bonds or double bonds; $R^9$, equal to or different from each other are $C_1$-$C_{40}$ hydrocarbyl radicals optionally containing one or more heteroatoms belonging to groups 13-17 of the Periodic Table of the Elements;

m ranges from 0 to 2; when m is 0 the group $T^1$ does not exist;

$T^1$ is a Lewis base; the group $T^1$ can also be bonded to the group $R^9$ or wherein in the compound of formula (II) above $M^1$ is titanium or chromium;

X has been described above $R^{12}$, $R^{13}$, $R^{14}$ and $R^{15}$, equal to or different from each other, are hydrogen atoms, halogen atoms, or $C_1$-$C_{40}$ hydrocarbon radicals optionally containing one or more heteroatoms belonging to groups 13-17 of the Periodic Table of the Elements; or two adjacent $R^{12}$, $R^{13}$, $R^{14}$ and $R^{15}$ may form one or more $C_3$-$C_7$-membered ring optionally containing heteroatoms belonging to groups 13-17 of the Periodic Table of the Elements;

$L^2$ is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms;

$A^1$ is optional group, when $A^1$ is absent $L^2$ a hydrogen or a hydrocarbyl; when $A^1$ is present, then $A^1$ a Lewis basic functionality.

16. A process comprising copolymerizing at least one olefin monomer and at least one functionalized olefin monomer with a catalyst system to obtain a polyolefin main chain having one or multiple functionalized short chain branches, the catalyst system comprising:

i) a single-site catalyst or catalyst precursor comprising a metal selected from Ti3+ or Cr3+;

ii) a co-catalyst;

iii) optionally a scavenger, wherein the molar ratio of the functionalized olefin monomer to catalyst is at least 500.

* * * * *